(12) United States Patent
Shinzou et al.

(10) Patent No.: US 7,045,768 B2
(45) Date of Patent: May 16, 2006

(54) DISPLACEMENT/QUANTITY OF LIGHT CONVERTER

(75) Inventors: Toru Shinzou, Sagamihara (JP); Yoshio Sakamoto, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 355 days.

(21) Appl. No.: 10/467,002

(22) PCT Filed: Feb. 19, 2002

(86) PCT No.: PCT/JP02/01423

§ 371 (c)(1),
(2), (4) Date: Aug. 1, 2003

(87) PCT Pub. No.: WO02/066939

PCT Pub. Date: Aug. 29, 2002

(65) Prior Publication Data

US 2004/0090686 A1    May 13, 2004

(30) Foreign Application Priority Data

Feb. 20, 2001    (JP) .............................. 2001-042728

(51) Int. Cl.
*H04B 10/02* (2006.01)
*G02B 6/26* (2006.01)

(52) U.S. Cl. ...................... 250/229; 181/157; 381/423; 250/231.1

(58) Field of Classification Search ................ 250/229, 250/231.1; 181/157; 381/423; 359/838, 359/846; 398/115, 132
See application file for complete search history.

(56) References Cited

U.S. PATENT DOCUMENTS

| | | | | |
|---|---|---|---|---|
| 3,327,584 A | * | 6/1967 | Kissinger | 356/614 |
| 3,389,372 A | * | 6/1968 | Halliday et al. | 367/105 |
| 4,422,182 A | * | 12/1983 | Kenjyo | 398/132 |
| 4,799,751 A | * | 1/1989 | Tekippe | 385/12 |
| 5,995,260 A | * | 11/1999 | Rabe | 398/115 |
| 2004/0238267 A1 | * | 12/2004 | Sakamoto et al. | 181/157 |

FOREIGN PATENT DOCUMENTS

JP    4-120428    4/1992

OTHER PUBLICATIONS

International Search Report.

* cited by examiner

*Primary Examiner*—Stephone B. Allen
(74) *Attorney, Agent, or Firm*—Eric J. Robinson; Robinson Intellectual Property Law Office, P.C.

(57) ABSTRACT

A displacement/quantity of light converter in which sensitivity to a micro displacement due to sound of a diaphragm, or the like, can be enhanced easily. In the displacement/quantity of light converter where a light emitting part (2) and a light receiving part (3) are disposed oppositely to a diaphragm (1), light emitted from the light emitting part (2) and reflected off the diaphragm (1) is received at the light receiving part (3), and a displacement of the diaphragm (1) is converted into an output from the light receiving part (3), a concave diaphragm is used and the concave face is directed toward the light emitting part (2) and the light receiving part (3). According to the arrangement, light emitted from the light emitting part (2) and reflected off the diaphragm (1) impinges efficiently on the light receiving part (3) in the form of focused light.

6 Claims, 7 Drawing Sheets

(a)

(c)

(b)

(d)

QUANTITY OF LIGHT IMPINGING
ON LIGHT RECEIVING PART

DISPLACEMENT/QUANTITY OF LIGHT CONVERTER

TECHNICAL FIELD

The present invention relates to a displacement/light-quantity converter that converts a mechanical vibration into a light signal. In particular, it relates to a displacement/light-quantity converter capable of converting a small mechanical displacement into a significant variation of light quantity.

BACKGROUND ART

An example of a conventional displacement/light-quantity converter for converting a mechanical vibration into a light signal will be described with reference to FIGS. 4 and 5. In the converter shown in FIG. 4, a planar diaphragm 4 is opposed to a light emitting part 2 and a light receiving part 3 at substantially the same distance d from the parts. Diverging light emitted from the light emitting part 2 at a certain emission angle is reflected off the diaphragm 4, and some of the reflected light reaches the light receiving part 3. FIG. 5 illustrates a relationship between the distance d from the light emitting part 2 and the light receiving part 3 to the diaphragm 4 and the quantity of light impinging on the light receiving part 3 in FIG. 4. As shown in FIG. 5(a), if the distance d from the light emitting part 2 and the light receiving part 3 to the diaphragm 4 is d1, which is less than a predetermined distance, the light emitted from the light emitting part 2 at the certain emission angle and reflected off the diaphragm 4 does not impinge on the light receiving part 3. However, as shown in FIG. 5(b), if the distance d is d2, which is larger than d1, the light emitted from the light emitting part 2 at the certain emission angle and reflected off the diaphragm 4 impinges on an area of the light receiving surface of the light receiving part 3.

Furthermore, as shown in FIG. 5(c), if the distance d is d3, which is larger than d2, the light emitted from the light emitting part 2 at the certain emission angle and reflected off the diaphragm 4 impinges on the entire light receiving surface of the light receiving part 3. Therefore, the quantity of light impinging on the light receiving part 3 increases linearly as the distance d increases from d1 to d3.

Furthermore, as shown in FIG. 5(d), if the distance d is d4, which is still larger than d3, the light emitted from the light emitting part 2 at the certain emission angle and reflected off the diaphragm 4 impinges on the entire light receiving surface of the light receiving part 3. However, if the distance d becomes larger than a predetermined value, the ratio of the quantity of light impinging on the light receiving part 3 to the quantity of light reflected off the diaphragm 4 is lowered. Thus, once the distance d becomes larger than the predetermined value d3, the quantity of light impinging on the light receiving part 3 gradually decreases.

FIG. 6 is a graph showing the relationship, illustrated in aforementioned FIGS. 4 and 5, between the distance d from the light emitting part 2 and the light receiving part 3 to the diaphragm 4 and the quantity of light impinging on the light receiving part 3. As can be seen from the graph in FIG. 6, if the central point of the distance from the light emitting part 2 and the light receiving part 3 to the diaphragm 4 is set to a point in the vicinity of d2, the quantity of light varies largely in response to a variation of the distanced. Thus, when the diaphragm 4 is displaced vertically (in the vertical direction of the diaphragm 4 in FIGS. 4 and 5) in a small amount, the quantity of light impinging on the light receiving part 3 changes linearly, and detecting this change can provide detection of such a small displacement.

The conventional displacement/light-quantity converter described above has a problem described below, because the diverging light emitted from the light emitting part 2 at the certain emission angle remains diverging even after being reflected of f the diaphragm 4 when it reaches the light receiving surface of the light receiving part 3. That is, since the diverging light reflected off the diaphragm 4 and impinging on the light receiving surface has diverged radially from the light emitting part 2, the quantity of light impinging on the light receiving surface of the light receiving part 3 is significantly reduced compared to the total quantity of light emitted from the light emitting part 2. Thus, even if the distance from the light emitting part and the light receiving part to the diaphragm is set at a value that allows the quantity of light impinging on the light receiving part 3 to change linearly, it is difficult to significantly enhance sensitivity of the diaphragm 4 to a small displacement. In order to enhance the sensitivity of the diaphragm 4 to a small displacement, the light emitting part 2 and the light receiving part 3 may be brought closer to each other. However, this approach leads to a problem that the flexibility in device design is compromised.

As another approach to enhance the sensitivity of the diaphragm 4 to a small displacement, the diaphragm 4 may be brought closer to the light emitting part 2 and the light receiving part 3. Again, however, this approach compromises the flexibility in device design. In addition, since the diaphragm 4 or the light emitting part 2 and light receiving part 3 need to be moved relative to each other, it is difficult to attain a high adjustment precision.

DISCLOSURE OF THE INVENTION

The present invention has been devised in view of the above-described disadvantages of conventional devices. An object of the invention is to provide a displacement/light-quantity converter in which detection sensitivity of a diaphragm to a small displacement thereof due to an acoustic wave and the like is readily and surely improved.

A displacement/light-quantity converter according to this invention has a light emitting part and a light receiving part both opposed to a diaphragm, the light receiving part receiving light emitted from the light emitting part and reflected off the diaphragm, and a displacement of the diaphragm being converted into an output of the light receiving part, in which the diaphragm has a concave surface, and the concave surface is opposed to the light emitting part and the light receiving part.

In addition, the concave surface is a rotational curved surface that is formed by rotating a curve 360 degrees about a central axis, which passes through a central point between the light emitting part and the light receiving part and is perpendicular to the diaphragm.

Alternatively, the rotational curved surface is a spherical surface that is formed by rotating a part of a circle 360 degrees about the central axis, the radius of curvature of the circle corresponding with a line connecting the central point between the light emitting part and the light receiving part to the diaphragm.

Alternatively, the rotational curved surface may be a curved surface that is formed by rotating a part of a curve 360 degrees about the central axis, the curve being composed of any one of a parabola, an ellipse, and another curve or a combination thereof.

Furthermore, the light emitting part and the light receiving part are incorporated in a single package.

Furthermore, the light emitting part is composed of a semiconductor laser element.

Alternatively, the light emitting part is composed of a vertical cavity surface emitting laser element.

MODE FOR CARRYING OUT THE INVENTION

Figure 1:
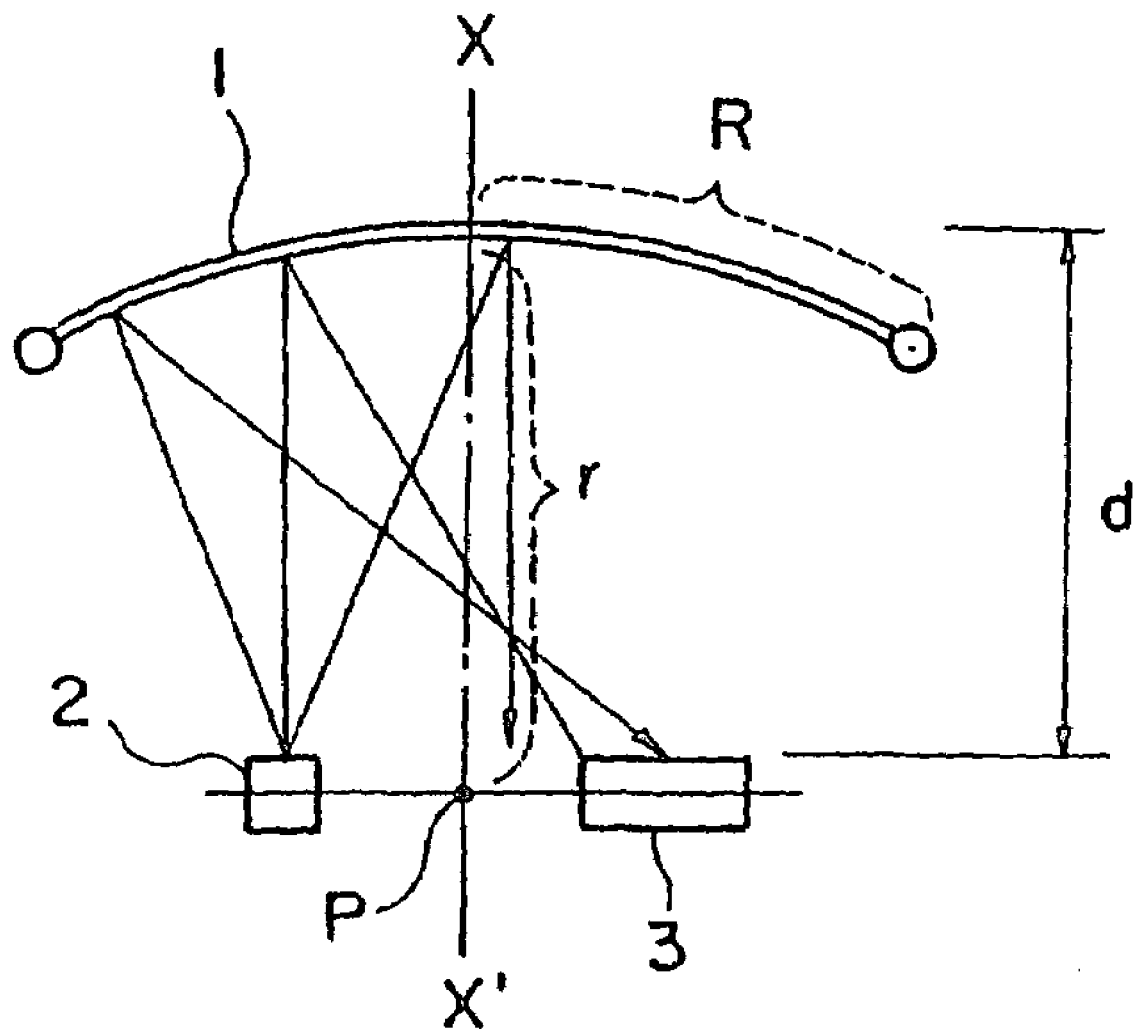
FIG. 1 shows an entire configuration of a displacement/light-quantity converter according to an embodiment of this invention.

In the following, a displacement/light-quantity converter according to an embodiment of the invention will be described with reference to the drawings. FIG. 1 shows an entire configuration of the displacement/light-quantity converter according to the embodiment of the invention. In this drawing, a light emitting part 2 and a light receiving part 3 are incorporated in a single package, and a concave diaphragm 1 is disposed at substantially the distance d from the parts facing its concave surface to the light emitting part 2 and the light receiving part 3. The concave surface of the diaphragm 1 is a rotational curved surface that is formed by rotating a curve R 360 degrees about a central axis X–X', which passes through a central point P between the light emitting part 2 and the light receiving part 3 and is perpendicular to the diaphragm 1. The curve R is a part of a circle, the radius of curvature r of which circle corresponds with the line connecting the central point P between the light emitting part 2 and the light receiving part 3 to the diaphragm 1. Rotating this curve R 360 degrees about the central axis X–X' provides a spherical surface, which is the rotational curved surface. Such a rotational curved surface allows the light emitted from the light emitting part 2 to be collected in the vicinity of the light receiving part 3.

Figure 2:
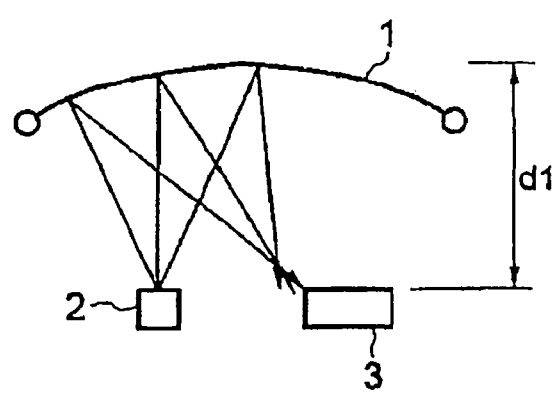
FIGS. 2(a)–(d) illustrate how light reflected off a diaphragm impinges on a light receiving part for variable distances from the diaphragm to a light emitting part and the light receiving part in the converter shown in FIG. 1.
Figure 2:
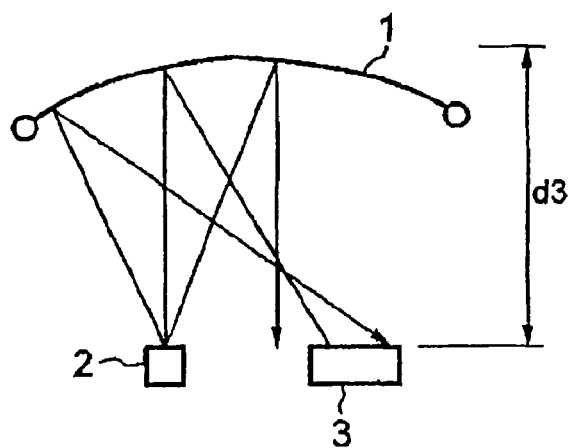
Figure 2:
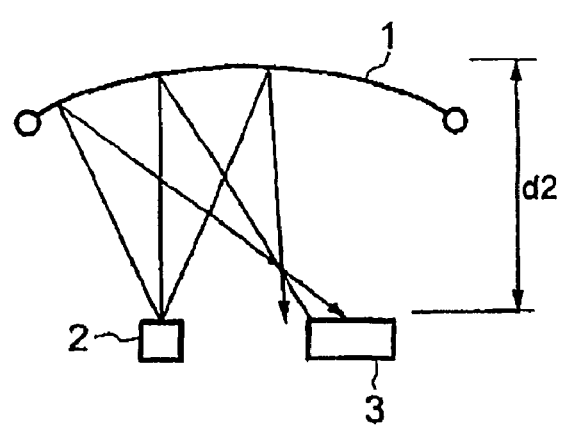
Figure 2:
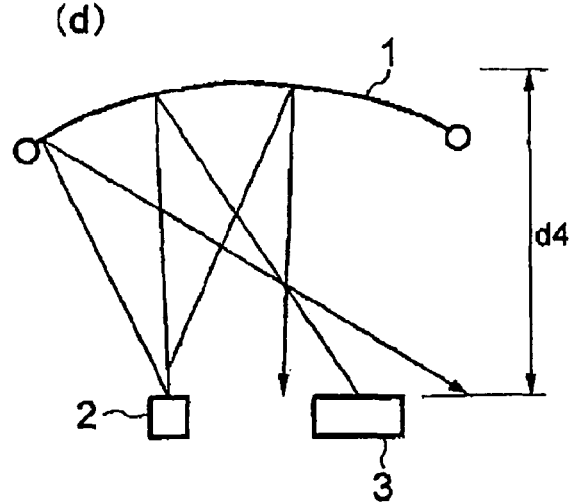

FIG. 2 illustrates a relationship between the distance d from the light emitting part 2 and the light receiving part 3 to the diaphragm 1 in the converter shown in FIG. 1 and the quantity of light impinging on the light receiving part 3. As shown in FIG. 2(a), if the distance d from the light emitting part 2 and the light receiving part 3 to the diaphragm 4 is d1, which is less than a predetermined distance, the light emitted from the light emitting part 2 at a certain emission angle and reflected off the diaphragm 1 does not impinge on the light receiving, part 3.

However, as shown in FIG. 2(b), if the distance d is d2, which is larger than d1, the light emitted from the light emitting part 2 at the certain emission angle and reflected off the diaphragm 1 impinges on an area of the light receiving surface of the light receiving part 3.

Furthermore, as shown in FIG. 2(c), if the distance d is d3, which is yet larger than d2, the light emitted from the light emitting part 2 at the certain emission angle and reflected off the diaphragm 1 impinges on the entire light receiving surface of the light receiving part 3. Therefore, the quantity of light impinging on the light receiving part 3 increases linearly as the distance d increases from d1 to d3.

Furthermore, as shown in FIG. 2(d), if the distance d is d4, which is still larger than d3, the light emitted from the light emitting part 2 at the certain emission angle and reflected off the diaphragm 1 impinges on the entire light receiving surface of the light receiving part 3. However, if the distance d becomes larger than a predetermined value, the ratio of the quantity of light impinging on the light receiving part 3 to the quantity of light reflected off the diaphragm 1 is lowered. Thus, once the distance d becomes larger than the predetermined value d3, the quantity of light impinging on the light receiving part 3 gradually decreases.

Figure 3:
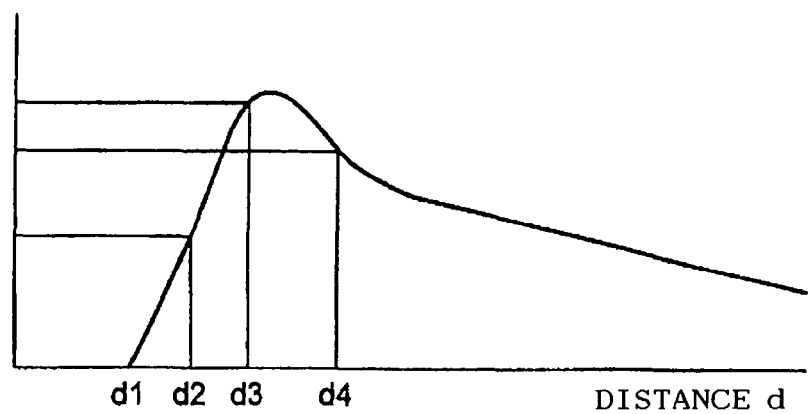
FIG. 3 is a graph showing a variation of the quantity of light impinging on the light receiving part caused by varying the distance from the diaphragm to the light emitting part and the light receiving part as shown in FIG. 2.
Figure 4:
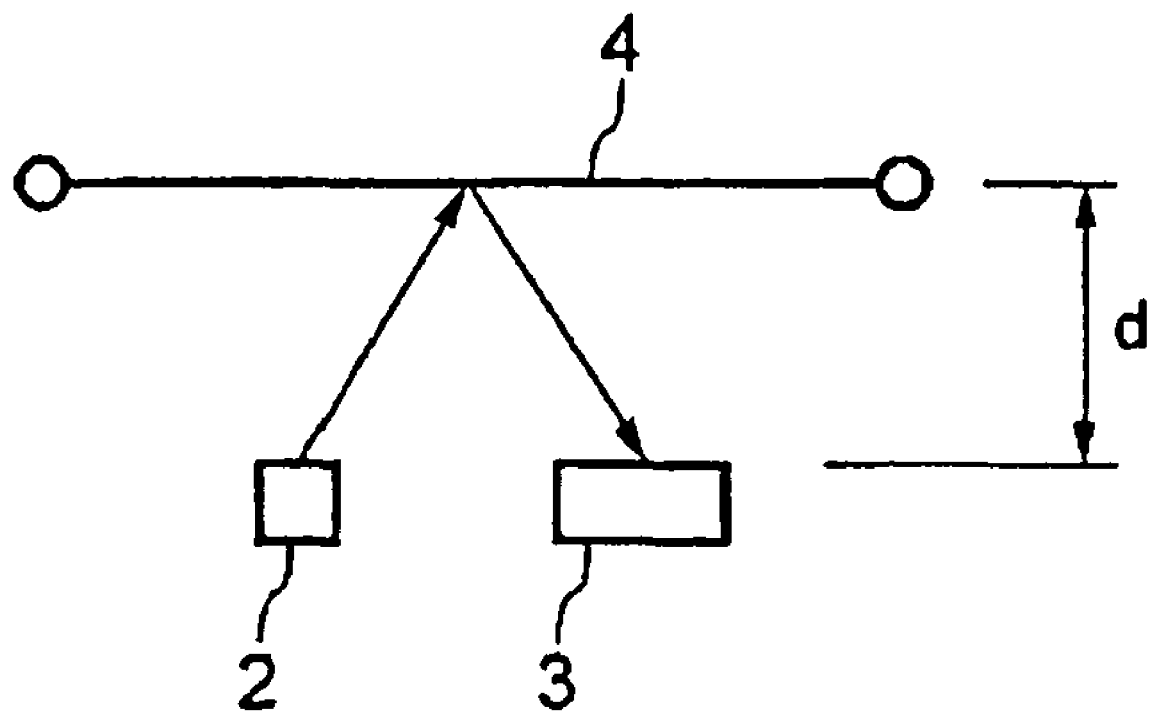
FIG. 4 shows an entire configuration of a conventional displacement/light-quantity converter.
Figure 5:
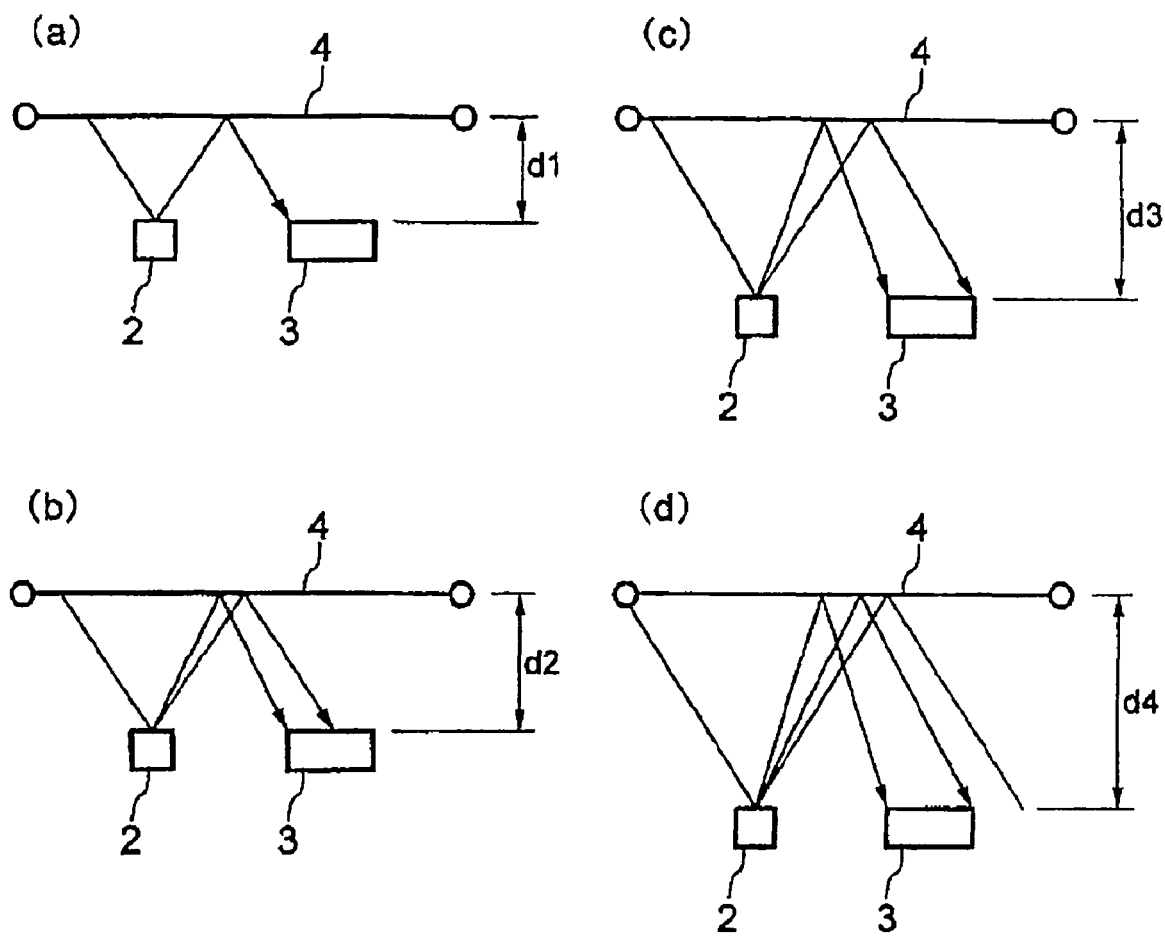
FIGS. 5(a)–(d) illustrate how light reflected off a diaphragm impinges on a light receiving part for variable distances from the diaphragm to a light emitting part and the light receiving part in the converter shown in FIG. 4.
Figure 6:
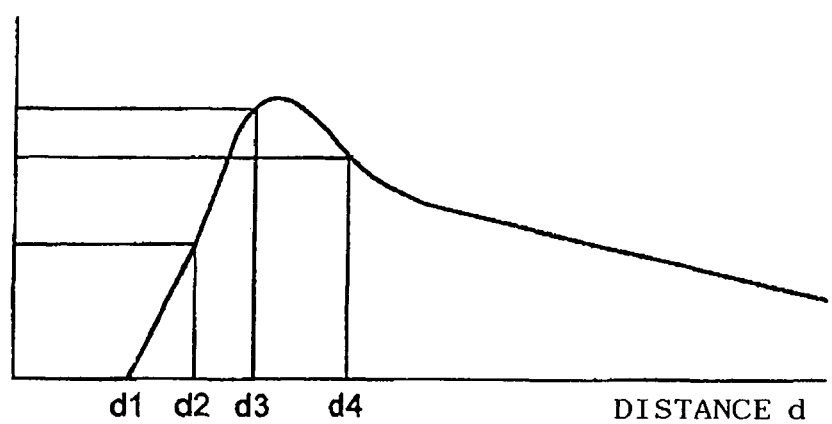
FIG. 6 is a graph showing a variation of the quantity of light impinging on the light receiving part caused by varying the distance from the diaphragm to the light emitting part and the light receiving part as shown in FIG. 5.

FIG. 3 is a graph showing the relationship between the distance d from the light emitting part 2 and the light receiving part 3 to the diaphragm 1 and the quantity of light impinging on the light receiving part 3. As can be seen from this graph, if the central point of the distance from the light emitting part 2 and the light receiving part 3 to the diaphragm 1 is set to a point in the vicinity of d2, the quantity of light varies largely in response to a variation of the distance d. Thus, when the diaphragm 1 is displaced vertically (in the vertical direction of the diaphragm 1 in FIGS. 1 and 2) in a small amount, the quantity of light impinging on the light receiving part 3 changes linearly, and it will be seen that detecting this change can provide detection of such a small displacement.

Figure 7:
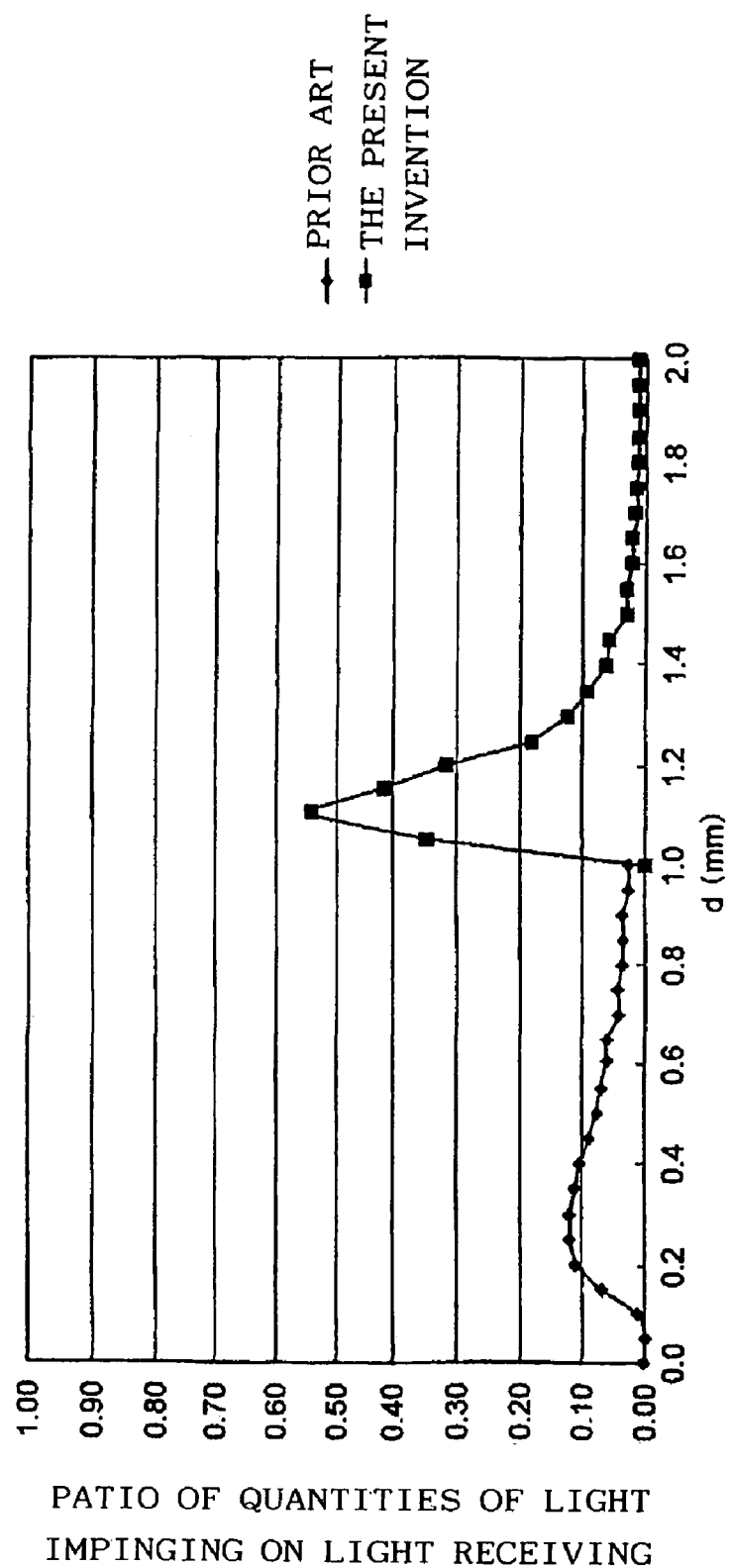
FIG. 7 is a graph showing the quantity of light impinging on the light receiving part, which is variously displaced, for the displacement/light-quantity converter according to the embodiment of the invention and the conventional displacement/light-quantity converter for comparison.

The diaphragm 1 according to this embodiment reflects the light emitted from the light emitting part 2 at the certain angle in the form of converging light, and the reflected light is collected in the vicinity of the light receiving part. Thus, the diaphragm 1 can launch a larger quantity of light to the light receiving part 3 than the conventional diaphragm 4 that reflects light in the form of diverging light. Therefore, the difference between the total quantity of light emitted from the light emitting part 2 and the quantity of light impinging on the light receiving part 3 is reduced, and thus, the sensitivity of the diaphragm 1 to a small displacement may be enhanced. FIG. 7 shows the ratio of the quantity of light impinging on the light receiving part 3 to the quantity of light emitted from the light emitting part 2 for the displacement/light-quantity converter according to this embodiment of the invention and the conventional displacement/light-quantity converter for comparison.

It should be understood that an embodiment of the invention is not limited to the configuration described above. For example, the shape of the diaphragm is not limited to the rotational curved surface, such as a spherical surface. It is essential only that the diaphragm has a concave surface, such as a paraboloid or toric surface, which changes the diverging light emitted from the light emitting part 2 at a certain angle into converging light and collects the same in the vicinity of the light receiving part 3. Furthermore, the rotational curved surface may be a curved surface which is formed by rotating a part of a curve composed of a combination of a parabola, an ellipse and other curves 360 degrees about the central axis.

In the displacement/light-quantity converter according to this invention, since the diaphragm reflects the light emitted from the light emitting part at the certain angle in the form of converging light, and the reflected light is collected in the vicinity of the light receiving part, the diaphragm can launch a larger quantity of light to the light receiving part than the conventional diaphragm that reflects light in the form of diverging light. Therefore, the difference between the total quantity of light emitted from the light emitting part and the quantity of light impinging on the light receiving part, that is, the light quantity loss is reduced, and thus, detection sensitivity of the diaphragm to a small displacement is enhanced.

In addition, since the distance from the diaphragm to the light emitting part and the light receiving part approximately equals to the radius of curvature of the curved surface of the diaphragm, the quantity of light impinging on the light receiving part can be increased without having to bring the light emitting part and the light receiving part closer to the diaphragm. Thus, the flexibility in device design and the adjustment precision can be improved.

The invention claimed is:

1. A displacement/light-quantity converter, comprising:
    a diaphragm; and
    a light emitting part and a light receiving part opposed to the diaphragm,
    said light receiving part receiving light emitted from said light emitting part and reflected off said diaphragm, and a vibrational displacement of said diaphragm being converted into a variation of Quantity of light received by said light receiving part,
    wherein said diaphragm has a concave surface, and the concave surface is opposed to said light emitting part and said light receiving part, and
    wherein the concave surface of said diaphragm is a rotational curved surface that is formed by rotating a curve 360 degrees about a central axis, which passes through a central point between said light emitting part and said light receiving part and is perpendicular to said diaphragm.

2. The displacement/light-quantity converter according to claim 1, wherein said rotational curved surface is a spherical surface that is formed by rotating a part of a circle 360 degrees about said central axis, the radius of curvature of the circle corresponding with a line connecting the central point between said light-emitting part and said light receiving part to said diaphragm.

3. The displacement/light-quantity converter according to claim 1, wherein said rotational curved surface is a curved surface that is formed by rotating a part of a curve 360 degrees about said central axis, the curve being composed of any one of a parabola, an ellipse, and another curve or a combination thereof.

4. The displacement/light-quantity converter according to any of claims 1 to 3, wherein said light emitting part and said light receiving part are incorporated in a single package.

5. The displacement/light-quantity converter according to any of claims 1 to 3, wherein said light emitting part is composed of a semiconductor laser element.

6. The displacement/light-quantity converter according to any of claims 1 to 3, wherein said light emitting part is composed of a vertical cavity surface emitting laser element.

* * * * *